(12) United States Patent
Lutnick et al.

(10) Patent No.: US 11,727,489 B2
(45) Date of Patent: Aug. 15, 2023

(54) INTERPROCESS COMMUNICATION FACILITATING SELLSIDE MARKETMAKING

(71) Applicant: BGC PARTNERS, INC., New York, NY (US)

(72) Inventors: Howard W. Lutnick, New York, NY (US); Michael Sweeting, London (GB); Shaun Lynn, London (GB); Philip Norton, London (GB); Rich Winter, New York, NY (US)

(73) Assignee: BGC PARTNERS, INC., New York, NY (US)

( * ) Notice: Subject to any disclaimer, the term of this patent is extended or adjusted under 35 U.S.C. 154(b) by 0 days.

(21) Appl. No.: 17/876,688

(22) Filed: Jul. 29, 2022

(65) Prior Publication Data

US 2022/0366497 A1 Nov. 17, 2022

Related U.S. Application Data

(63) Continuation of application No. 16/921,605, filed on Jul. 6, 2020, now Pat. No. 11,403,705, which is a continuation of application No. 15/622,977, filed on Jun. 14, 2017, now Pat. No. 10,706,471.

(60) Provisional application No. 62/376,665, filed on Aug. 18, 2016, provisional application No. 62/375,231, filed on Aug. 15, 2016, provisional application No. 62/350,141, filed on Jun. 14, 2016.

(51) Int. Cl.
*G06Q 10/04* (2023.01)
*G06Q 30/08* (2012.01)
*G06Q 40/04* (2012.01)

(52) U.S. Cl.
CPC .............. *G06Q 40/04* (2013.01); *G06Q 30/08* (2013.01)

(58) Field of Classification Search
CPC ....................................................... G06Q 40/04
USPC .......................................................... 705/37
See application file for complete search history.

(56) References Cited

U.S. PATENT DOCUMENTS

2010/0088214 A1\* 4/2010 Czupek ................. G06Q 40/04
705/37

\* cited by examiner

*Primary Examiner* — Cho Kwong

(57) ABSTRACT

An electronic exchange platform configured to: receive respective list of approved Buyside participants for each of a plurality of marketmaking orders; receive a respective marketmaking order for a side of trades on the financial instrument from each of the plurality of Sellside participants; peg a price for the received marketmaking orders to a price relative to and multiple ticks behind a best price on the side in an order book; present market information to Buyside participants identifying marketmaking orders for which the Buyside participants are approved; receive a contra order from a Buyside participant that is approved to trade with a subset of the plurality of marketmaking orders, in which the contra order identifies preferred Sellside participants; distribute the contra order; and determine new best bid and offer in response to the distribution; and adjust remaining marketmaking offers to retain peg in response to determining new best bid or offer.

14 Claims, 3 Drawing Sheets

INTERPROCESS COMMUNICATION FACILITATING SELLSIDE MARKETMAKING

CROSS-REFERENCE TO RELATED APPLICATIONS

This application is a continuation of U.S. patent application Ser. No. 16/921,605 filed Jul. 6, 2020, which is a continuation of U.S. patent application Ser. No. 15/622,977 filed Jun. 14, 2017 (now U.S. Pat. No. 10,706,471 issued Jul. 7, 2020), which claims priority to U.S. Provisional Application 62/350,141 filed Jun. 14, 2016, U.S. Provisional Application 62/375,231 filed Aug. 15, 2016, and U.S. Provisional Application 62/376,665 filed Aug. 18, 2016, each of which are hereby incorporated herein by reference in their entireties.

FIELD

Some embodiments relate to Sellside market making in an all-to-all marketplace to favored Buyside customers as a private Liquidity Provision.

BACKGROUND

Parties trade in financial instruments such as stocks and bonds.

BRIEF DESCRIPTION OF THE FIGURES

FIGS. 3 and 4 show example interfaces that may be used in some embodiments.

SUMMARY

Figure 1:
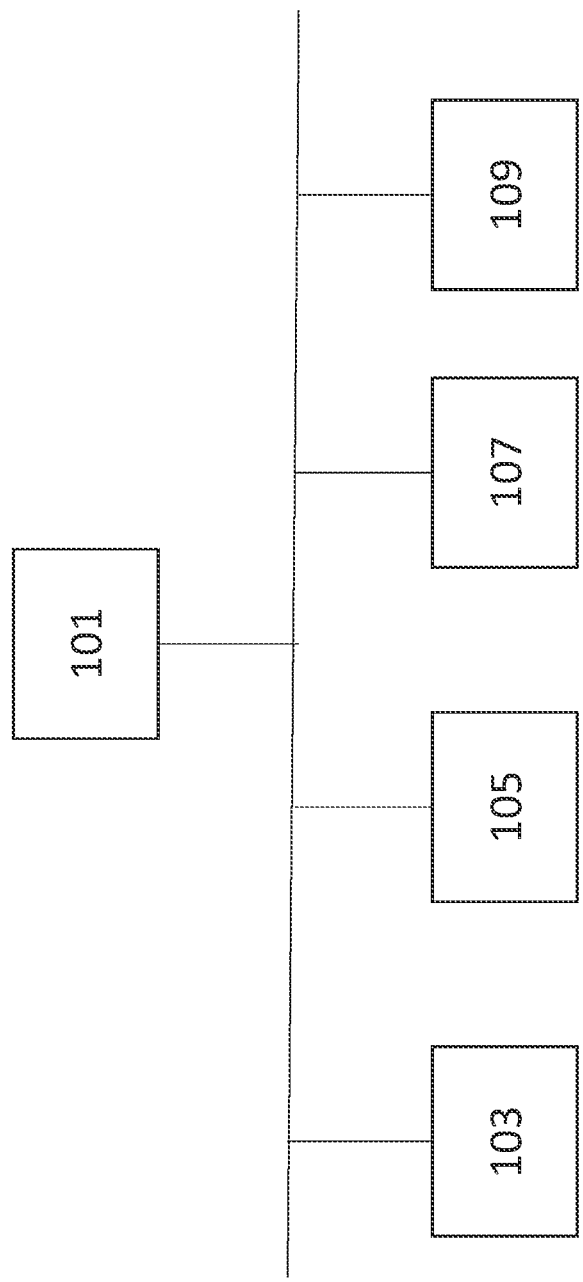
FIG. 1 shows an example system according to some embodiments.

The following should be understood as embodiments and not claims.

DETAILED DESCRIPTION

First Example Embodiments

Various examples of trading systems and methods that may be used in some embodiments are described in U.S. patent application Ser. No. 14/059,000 to Sweeting, et al. and U.S. patent application Ser. No. 12/938,189 to Sweeting, et al. both of which are hereby incorporated by reference in their entirety.

Some embodiments may provide for Liquidity Provider (Sellside Banks and/or High frequency Trading/Proprietary Trading Firm Market Makers in some markets, collectively referred to here as "Sellside") orders for Buyside (e.g. Traditional Fund Managers, Hedge Fund Managers, Commodity Trading Advisors) liquidity. Such a liquidity provision order may be outside of a best bid/offer available through an all-to-all marketplace such as a Central Limit Order Book (CLOB, or just "order book"). Nonetheless, such a liquidity provision order may be pegged to the best bid/offer. For example, a marketplace may operate using decimal pricing and a liquidity provision order may be set at two price ticks away (bids lower, offers higher in traditional percentage pricing formats or offers lower, bids higher in yield formats) from a best bid/offer. Other implementations may have other arrangements, such as non-decimal pricing and/or one, four, ten and so on ticks (or minimum price movements) away from the best price showing in a CLOB. Other implementations may not peg the liquidity provision orders to the best bid/offer at all. A platform may offer a variety of system configurations per instrument section, such as (i) [10] $/m. back for $[100]m, (ii) [20] $/m back for $[200]m, and so on, with the numbers in [ ]configurable on a daily or hourly basis or linked to some external factor such as implied or realised volatility.

A marketplace may be configured to show availability to trade to a list of trader logins and API connections and to these traders also via Order Management Systems and Execution Management Systems (OMS/EMS) of certain Buyside entities configured to see such liquidity provision.

In one example, a passive liquidity provision order to make a market may be 10 Dollars per million in decimals ($/m) back from the top of the order book (e.g., central limit order book or CLOB) priced in decimals of a percentage point. In some embodiments, for example Mortgage backed bonds usually priced in fractions of a $32^{nd}$ of a percentage point, when a top of book GLOB price approaches a nearest ¼ of a $32^{nd}$ below for bids or above for offers, a marketplace may limit a price for a liquidity provision order showing in decimals behind the top of book CLOB price but still inside a traditional fraction of a $32^{nd}$ priced CLOB showing on other venues. A passive liquidity provision order price may be limited to a respective increment of a $32^{nd}$ as the decimals price approaches the fraction of a $32^{nd}$ level, with the prescribed 10$/m spread back (from the top of the book CLUB price) becoming temporarily compacted as a result. Trading Risk of this Liquidity Provision order price compaction may rise as the $32^{nd}$ increment is approached by the all-to-all CLUB market price. Limiting size proffered by a Market Maker to favoured Buyside Customers at this Liquidity Provision pricing accordingly may limit such risk. A market maker may compare market data (e.g., available through Denies) with other venues to ascertain when a liquidity provision order should remain current (with or without such systemic size limitation) or be cancelled because of market price compaction risks. It should be recognized that increments are given as non-limiting examples and other embodiments may include other increments (e.g., a ½ of a $32^{nd}$ for some Mortgage-Backed bonds or $⅛^{th}$ of a $32^{nd}$ for some off-the-run Treasury bonds up to 2Y maturities).

In some embodiments, users that submit liquidity provision orders as described herein may be limited from discovering sizes of other users' liquidity provision orders. Instead, in some embodiments, liquidity provision orders may be shown only to Buyside entities configured by the system to see them, with agreement by both the Market Maker placing the pegged Liquidity Provision order and also the Buyside customer viewing them. Even such Buyside entities may be further limited intraday to only see those liquidity provision orders that market makers identify to the marketplace as ones they wish to show liquidity to at any one point in time. In some embodiments, additions to the list may be made via a production support team of the marketplace or a GUI based "request for coverage" message as is known in the art.

In some embodiments, liquidity provision orders may be considered, matched, presented and/or used cumulative with the best bid/offer sizes (e.g., the best price). A user interface presenting liquidity provision order information may be presented to Buyside entities for whom the orders are available, information about such orders may be presented alongside the regular order book for Buyside users for whom the orders are available. In some embodiments, such information may be available in a mouse over popup interface for such Buyside users for whom the orders are available to show the Buyside trader the full liquidity available to them behind the best bid and offer showing in the order book.

Liquidity provision order sizes may also be presented in a new order ticket window user interface. An aggressive liquidity provision order type may be available in some embodiments. Both order book best price and liquidity provision order sizes may be displayed separately (e.g., order book bid/offer above/below liquidity orders that are behind those orders in price terms) in a user interface. In some embodiments, in response to aggressor size being entered into either buy or sell orientated boxes of a user interface, a liquidity provision size may be aggregated with the best bid/offer size from the order book to present an average price for that size in the window. A sell down to/buy up option may be available in some embodiments.

In some embodiments, a passive liquidity provision order may be accepted via a FIX and/or Itch/Ouch API. In some embodiments, market maker passive liquidity provision orders may be available to be provided through a Sellside GUI. Other embodiments may not make such orders available to be provided through a Sellside GUI. In both these embodiments of a Sellside GUI and API, the viewing of other Sellside Liquidity Provision orders may be restricted or may be made available for all to see.

In some embodiments, a Buyside entity's Traders may access Sellside's passive liquidity provision orders through an aggressive liquidity provision order. In some embodiments, such an order type may be unavailable to a Buyside entity if the Buyside entity has an opposing order in an order stack to what his true intention is with the liquidity provision orders. For example, a Buyside entity may be unable to hit/sell a 100 m liquidity provision bid order after bidding up in quail sizes to raise the Liquidity provision orders showing a set amount of price increments behind the best CLOB bid.

In some embodiments, a marketplace may determine when to present an aggressive liquidity provision order to match with an available passive liquidity provision order. The marketplace may use a variety of factors in making such a determination. An aggressive liquidity provision order may be presented in response to the order book best price being traded to its full size by the Trader using an aggressive liquidity provision order type. A remaining size of an aggressive liquidity provision order (from a Buyside Trader or a Trader configured to use such) may be available to trade against one or more passive liquidity provision orders (from Sellside traders or Traders configured to use such) behind the best price.

In some embodiments, each first best price order in the order book with a matching (e.g., from a same order submitter) passive liquidity provision order behind the best price may be eligible for preferred execution against the aggressive liquidity provision order at the passive liquidity order provision price level through the matching of the passive liquidity provision orders. Size remaining after such preferred execution may be distributed among other orders. A technical effect of this adjustable matching preference is to encourage Sellside traders to place CLOB orders at the best price, thus often closing in the bid/offer spread at the CLOB top of book price levels.

In some embodiments, existence of an order at the best price may make eligible matching of passive liquidity provision orders behind the best price. In some embodiments, matching behind the best price with the liquidity provision orders that have corresponding best priced orders may happen prior to matching with orders at the best price.

In some embodiments, a Buyside aggressor may assign a "promo code" or preferred status to a market maker. If that market maker has a passive liquidity provision order present, that order may be given preference in size distribution. This may be the case even if the market maker does not have an order at the best order book price. In some embodiments, the market maker need not have a passive order present to engage in trading with the aggressor at their passive liquidity provision order price level. The market maker may be identified by a promo code used with the aggressive liquidity provision order and their passive liquidity provision order be traded whole or in part as a result. In some embodiments, the market maker may be identified by a promo code used with the aggressive liquidity provision order and even when the market maker has no passive liquidity provision order present to match against, they would be invited via electronic message to submit a counter order in response to receive preferential matching. In some embodiments, a promo code may identify multiple market makers. The market markets may be identified in order of preference, to be treated equally, and so on. For example a promo code that identifies four market makers A B C and D may first provide size to A then B and so on. In another implementation size may pro rata fill or fill according to some other algorithm as described herein or elsewhere with A B C and D.

In some embodiments, size may be divided according to some ranking coefficient. If a market maker is high enough ranking, they may at certain times receive preferential matching for part or all of an aggressive liquidity provision order. In other embodiments, size may be divided evenly, pro rate, and/or according to some other preference such as time and/or size order preference.

In some embodiments, size may be distributed according to a percentage of size traded at the best order book price. In some embodiments, that percentage may be divided by a daily, weekly, monthly or annually calculated ranking coefficient from market participation. Other methods of determining coefficients, if used at all, may be used. In some implementations, a top ranked market maker may be given preference over other market makers. In some implementations, size may be distributed among market makers in accordance with the determined coefficients.

In some embodiments, if there is still size left after such algorithmic size allocation, then size may be matched with passive liquidity provision orders that do not have matching best orders in an order book. Such matching may take place in a pro rata fashion in some embodiments. Such matching may be taken place with a preference given to participants with a better order book price in some embodiments.

In some embodiments, a promo code or preferred status may be available through a GUI and/or FIX API. Such a promo code may indicate that a marketplace should preference a particular market maker's passive liquidity provision orders even if a standard size distribution algorithm would not match with that market maker.

In some embodiments the promo code may default to or otherwise be empty so that the algorithm described elsewhere may be used. In some embodiments a trader or system specialist may change a default so that the default is not blank but rather some other promo code. In some embodiments, a trader may use a GUI to change a default to some other promo code. Where a market maker identified by a promo code has a passive liquidity provision order pending, the market maker would receive size as described elsewhere.

In some embodiments, a system may make a determination whether to use liquidity provision orders at all to fill an order. For example, a determination may be made that there is sufficient liquidity in orders outside of the liquidity provision order to fill an aggressor order at a better price than with the liquidity provision orders. In such a situation, an aggressor order may be filled at the better price for the aggressor without use of the liquidity provision orders. This situation may arise for example if there are large amounts of liquidity at a best bid or offer.

In some embodiments, trade confirmations may aggregate to reduce ticket, numbers. For example, when using an aggressive liquidity provision order, a single averaged execution at a slightly better price (for the aggressive liquidity provision order user) than the liquidity provision price level may be presented rather than multiple tickets at different price levels.

In some embodiments, elements of trading activity may remain anonymous and/or unpublished. Such anonymity and/or unpublished status may last for some limited time. For example, in some embodiments, liquidity provision trade sizes may not be immediately published but may be added to total size traded at the end of the trading day. In some embodiments, liquidity provision trades may be excluded from end of day high and low value calculations. In some embodiments, liquidity provision trades may be labelled as such in post trade STP messaging and for trade or regulatory reporting purposes.

In some embodiments, a daily randomized customer identification number may be attributed to every Buyside entity. This number may be added to post-trade STP messages for the contra-Sellside market maker. A Sellside market maker may use such information to request removal of an abusing Buyside entity from their enabled pool. Abuse may raise an alert to the production support team of the marketplace for investigation. Other suspicious occurrences of market data manipulation before liquidity provision orders get hit or lifted may also raise an alert.

In some embodiments, a marketplace may adjust liquidity provision orders as a best bid/offer changes. Such order may be adjusted en mass as the market moves. In some embodiments, a single bid or offer may move the best price of the market and in response many liquidity provision order may be adjusted. In some embodiments, a marketplace and/or order may include a size threshold and/or decimal price increment that must be reached before a liquidity provision order is adjusted.

While examples are discussed of a liquidity provision order that does not have a matching order at the best price being used to provide size, it should be recognized that other implementations may not access such orders.

In some embodiments, liquidity provision order size presented may be governed by a bilateral permission matrix so that market makers can set up preferred counterparties.

Some embodiments of a marketplace may interact with an Order Management System (OMS) such as Fidessa or Aladdin (as is well used in the marketplace). A GUI of such a system may tag size of liquidity provision orders and order hook orders differently. Accordingly, the orders may be differentiated between regular CLOB size and liquidity provision order size that can only reached by trading the best CLOB price substantially simultaneously.

Figures 3, 4:
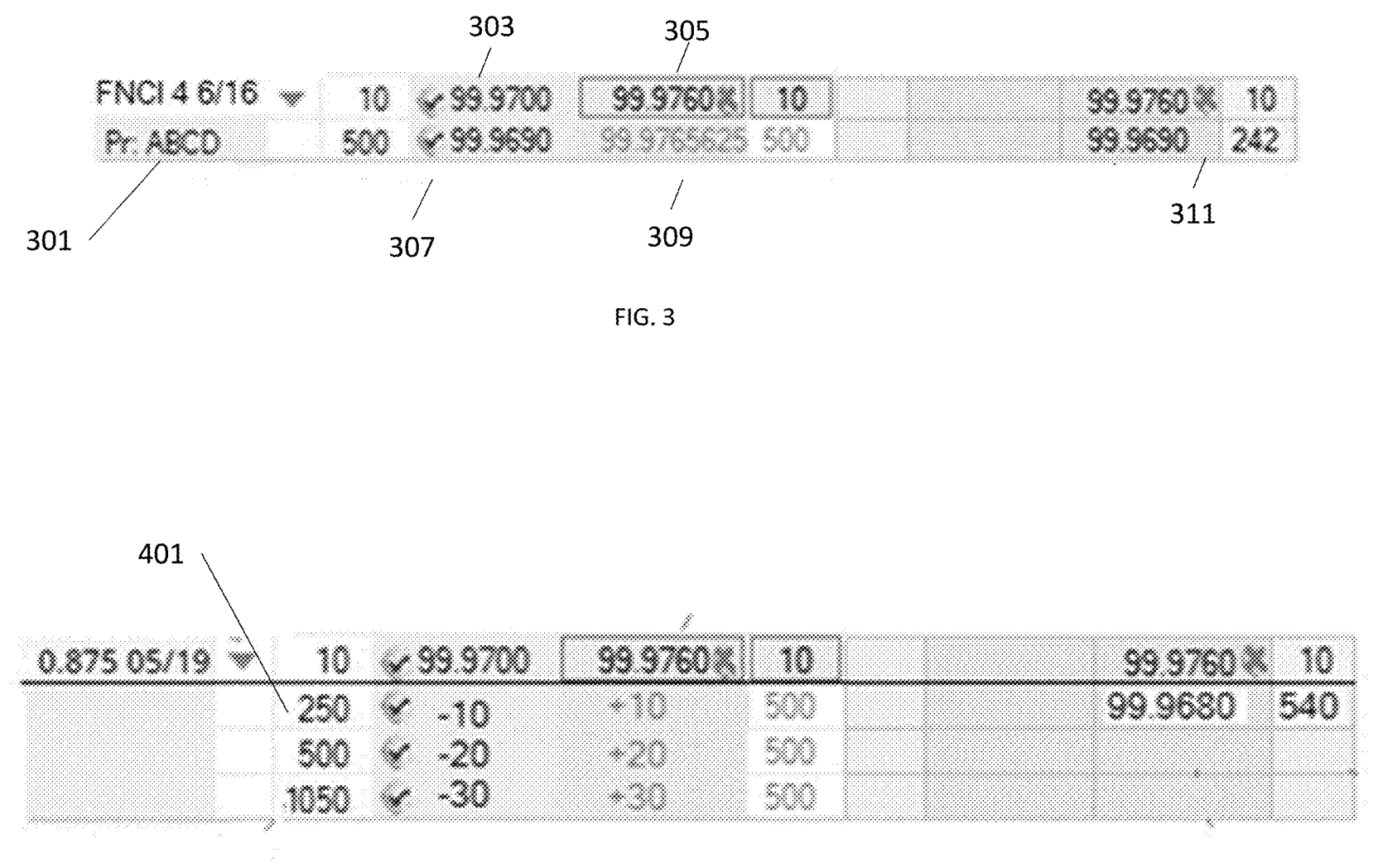

FIG. 3 shows an example interface (as seen by a Buyside user) showing a first row having an order at an order book best price and a liquidity provision order at a worse price (to the user). Size available to trade at the liquidity provision price may be significantly higher than at the order book price in some embodiments. This example interface shows examples of:

(i) the promo code as described above at element 301. A user may input promo code information into an interface element to influence order fulfilment.

(ii) the top line best of order book (CLOB price 99.9700 bid, 99.9760 offered) at element 303 and 305. The interface may adjust as CLOB changes. The interface shows an "x" to cancel the users order through the interface because the user has a pending offer at the best CLOB price.

(iii) the second line of passive liquidity provision bid order size available at element 307

(iv) the non-availability of the passive liquidity provision order offers at 99.9765625 (due to the existence of the Buyside trader's CLOB offer showing at 99.9760) at element 309. This may be indicated by a lightening of an interface element, a colouring of an interface element, and/or in any desired manner to indicate to a user that an order is unavailable. As orders are entered or the CLOB changes, the availability of orders may change, and the interface may adjust to indicate such changes.

(v) the aggressive liquidity provision offer order of size 242 at price 99.9690 ready to be sent to the system for matching at element 311. A user may click the interface on the price show on the interface (99.9690) to submit an order at that price. A user may enter a size such as the 242 shown in the interface to trade at that size.

(vi) the price compaction of passive liquidity provision offer orders that would be offered at 99.9770 but are instead compacted to the decimal equivalent (99.9765625) of the nearest ¼ of a $32^{nd}$ (99 and $31¼/32^{nds}$) at element 309.

Another example interface that may be used in some embodiments is shown in FIG. 4

This interface has many similarities to the prior interface. It may be used to view information about liquidity and/or submit orders. This interface does not include a promo code portion (though it might in other instances where a promo code is being offered). Further, in this example, pricing levels are shown as differentials from a razors edge or best bid/best offer price. For example, there is 250 volume pending at 99.9690 as indicated at 401, 500 volume pending at 99.9680 and 1050 volume pending at 99.9670 to buy where the best bid is 99.9700. In this interface, these orders are shown as 250 at −10 from the best bid, 500 at −20 from the best bid and 1050 at −30 from the best bid. These orders may float in actual price as the best bid moves but may stay at the relative price distance. So, showing the differential and the best bid shows the information from which the actual price may be derived. Similarly, a +10, +20, +30, etc. is shown on the offer side. The example does not show a price compaction being shown in the interface. In some instances, a price compaction may not occur. In some instances, a price compaction may occur even if it is not shown in the interface. In other embodiments, a price compaction may occur and may be shown in the interface. For example, instead of showing +10 corresponding to a 99.9770 price, the interface may show +5.625 corresponding to a 99.9765625 price.

In some embodiments compaction may be optional and/or variable. For example, rather than compacting to a set increment (e.g., ¹⁄₃₂), compaction may move to better than that increment so that price of the liquidity provision order is better than the ¹⁄₃₂ increment. The degree to which it is better may vary. As illustrated above, an increment may be at 99.9765625, and an order at 99.9770 may compact to the increment in some embodiments. In other embodiments, the order may compact past the increment to 99.9766, for example. An amount of compaction may be configurable. Whether compaction is applied or not may be configurable. Such configurability may be on a participant level, an order level, and/or an instrument level. For example, a Sellside participant may use no compaction for one instrument, increment level compaction on another instrument, and better than increment level compaction on yet another instrument (e.g., by submitting compaction information to a marketplace). In some embodiments, the participant may determine how much better than the increment the compaction will be (e.g., by submitting compaction information to a marketplace).

In some embodiments, parties (e.g., Sellside participants that submit passive liquidity provision orders and Buyside participants that submit aggressive orders) may determine which counterparties they are willing to trade with. This may be a requirement of a market to enable trading on the market. For example, participants may be required to submit at least three counterparties that they are willing to trade with. The marketplace may retain the enabled trading party information as private and secure. For example, a marketplace may store the information in an encrypted matrix that matches each party with approved counterparties. The approved counter party matrix may be accessed to determine which orders are accessible by each party. In some implementations, such approval may apply to all trading. In other implementations, such approval may apply to liquidity provision trading and not CLOB trading. Approval may take place at an entity level, an order level, an instrument level and so on.

In some embodiments, a user interface may present liquidity provision order information to a party. To determine which information should be presented through the user interface, a marketplace may access an approved counterparty matrix to determine which counterparties have bilateral approval for the party. For each counter party for which the matrix indicates bilateral approval, information about liquidity provision order may be determined and used to populate the interface. Accordingly, the party may be shown information about liquidity provision orders for counterparties that have bilateral approval.

In some embodiments, a Buyside participants may be given an option of requesting liquidity provision orders from a specific Sellside participant. For example, a Buyside participant may desire to see liquidity provision orders from JP Morgan. The marketplace may determine such orders and present them to the Buyside participant (e.g., if the parties are bilaterally approved). This feature may remove an element of anonymity for the Sellside participant. However, this feature may enable the Buyside participants to provide trades more easily to those participants with which they have favorable relationships. Other embodiments may not have such a feature to protect anonymity.

In some embodiments, Sellside participants can provide passive liquidity provision orders but may not be able to view those order from other participants. In some embodiments, Sellside participants can enter CLOB order and passive liquidity provision orders but not aggressive liquidity provision orders. In some embodiments, Buyside participants can enter CLOB orders and aggressive liquidity provision orders but not passive liquidity provision orders.

It should be recognized that the examples given are non-limiting. Other embodiments may include additional, fewer, or different elements. Embodiments may be combined in any arrangement with one another. Some examples may be used for FX trading, treasury trading, mortgage backed bonds, any OTC trading and/or other trading desired.

Second Example Embodiments

Some embodiments provide a platform for trading financial instruments such as mortgage backed bonds. The platform may enable any number of Sellside participants to enter market making orders pegged to a best bid or best offer price for a financial instrument. The Sellside market making orders may be available to Sellside approved Buyside participants. The platform may distribute size of contra orders among market making orders based on one or more factors discussed herein. The platform may adjust market making orders as the market moves. The platform may provide an interface through which market making orders available to a Buyside participant are discernible to that participant. The platform may denominate sales in a decimal manner and provide price compaction protection as that price approaches a fractional value available through the marketplace and/or other venues.

FIG. 1 illustrates an example platform that may be used in some embodiments. As indicated the platform may include a marketplace 101, a first Buyside participant 103, a second Buyside participant 15, a first Sellside participant 107 and a second Sellside participant 109.

Marketplace 101 may include a computing device configured to enable trading of financial instruments. The marketplace may accept buy and sell orders for one or more financial instruments The computing device may be configure manage, track, match, and clear orders. The computing device may include a matching engine configured for high speed, low latency matching of orders.

Buyside participants 103 and 105 may include for example hedge funds or other participants that may make up the Buyside of a market. Buyside participants may engage in buying and selling of financial instruments through the marketplace. Buy side participants may include computing devices configured to enable trading through the marketplace. Such computing system may include order management systems configured to track trading intentions in confidence for a Buyside entity.

Sellside participants 107 and 109 may include, for example, high frequency trading entities or other participants that make up the Sellside of a market. Sellside participants may engage in buying and selling of financial instruments through the marketplace. Sellside participants may include computing devices configured to enable trading through the marketplace.

A marketplace may provide an API through which Buyside and Sellside participants may communicate orders. For example FIX messaging through a communication network such as the internet may be used to submit orders to a marketplace. The marketplace may receive information through the API and interpret the information as an order.

The marketplace may enable Sellside participants to act as market makers for a financial instrument. A Sellside participant may act as a market maker by submitting a market making order to the marketplace. In some implementations, the market making order may be one side (e.g., a sell order or a buy order). In other implementations, a two sided order (sell and buy order may be used).

For example, Sellside participant 107 may submit a market making buy order to the marketplace for a financial instrument (e.g., mortgage backed bond) using an API of the marketplace and a FIX messaging format. The marketplace may receive the order and add the Sellside participant as a liquidity provider for the buying side of the financial instrument. The market making buy order may have a size associated therewith. The size may be required to meet some marketplace minimum order size that is higher than for a regular order book order (e.g., 200 million as compared to 1 million).

Similarly, second Sellside participant 109 may submit a second market making buy order to the marketplace for the same financial instrument using the API and a FIX message. The marketplace may receive the second order and add the second Sellside participant as a liquidity provider for the buying side of the financial instrument.

Accordingly, multiple Sellside participants may make a market on the same side of a single financial instrument. Any number of Sellside participants may act as market makers on a single order side of a single financial instrument.

Prices for market maker orders may be managed by the marketplace. The price may be pegged to a best bid and/or best offer of pending in an order book of the marketplace. For example, if a highest bid is currently 99.95, then a marketmaking order to buy (such as those received in the example from the first and second Sellside participants) may be pegged at some level relative to 99.95. In some implementation, that level may be two ticks (i.e., minimum price adjustments) worse than the best market price. For example, if the minimum price adjustment in the marketplace is 0.05, then in this example, the market making buy orders for each of the Sellside participants would be set at 99.85.

It should be recognized that the example of decimal pricing, two ticks, and tick size are all given as non-limiting examples only. Two ticks may provide a level of price protection that is deemed appropriate for a market maker in this example market. For instruments that have more or less liquidity and/or volatility that level of protection may be increased or decreased.

As a best bid or offer in an order book moves, market-maker bids and offers may be adjusted in response by the marketplace to maintain the pegged relationship. For example, if the best bid in the example changes based on a new bid being received to 100.00, then the price for the marketmaker buy orders may be adjusted to 99.90 in response.

In some embodiments, a marketplace may deviate from a standard pegging of marketmaker orders to a best bid or offer in some circumstances. For example, a marketplace may operate in a decimal pricing model while other marketplaces may operate at fractional pricing models (e.g., ¼s of 32nds). When at a decimal pricing marketplace the adjustment of a price to maintain a pegging would cross a fractional pricing model price, the marketplace may set the price at the fractional pricing instead. This may offer a level of price compression protection to the marketmakers. For example, if a best offer is set at 99.9760 in a marketplace with ticks of 0.0005, typically a marketmaking offer may be set at 99.9770. However, with a compression protection applied, where there is a fractional price boundary at 99.9765625, the price may instead by set at the boundary of 99.9765625. This number may be rounded or truncated to the 99.9765 level in some implementations.

In some embodiments compression may be configurable by the marketmakers. A marketmaker may submit a command to the marketplace to not apply compression to an instrument type, to all orders, to a particular order, etc. The marketplace may act accordingly in response. A marketmaker may submit a command to use standard increment level compression (e.g., compress to the boundary) to an instrument type, to all orders, to a particular order, etc. The marketplace may act accordingly in response. A marketmaker may submit a command to use better than increment level compression (e.g., compress to a better than the boundary level) to an instrument type, to all orders, to a particular order, etc. The marketplace may act accordingly in response. A marketmaker may submit information identifying a degree to which a better than increment level compression should be better than a boundary (e.g., by percentage, by basis points, by price, etc.). A marketplace may act accordingly in response. A marketmaker may change such compression attributes as desired. In some embodiments, a marketmaker may use no compression for one instrument, increment level compression on another instrument, and better than increment level compression on yet another instrument in any combination desired.

In some embodiments, the Sellside marketmaker orders may be open to the entire market. In other implementations the marketmaker order may be open only to Buyside participants. In still other embodiments, the marketmaker orders may be limited to those Buyside participants that are approved for trading by the Sellside participant making the market. Making a market may involve risk of gaming and information leakage. So, those participants that engage in that behavior may desire anonymity and protection of their information. By limiting those entities that can trade with the marketmaking orders, the marketplace may provide the Sellside marketmakers with a level of security that encourages marketmaking and discourages market gaming.

A Sellside participant may identify to the marketplace a list of approver buyside entities for a marketmaking order. The approved list may vary per order and/or per Sellside participant. The marketplace may receive the list before, with the order, and/or after the order. The marketplace may make the order available to only the approved Buyside entities. For example, the first Sellside participant may identify that the first Buyside participant only should be able to trade on the buying market making order. The second Sellside participant may identify that both the first and the second Buyside participants should be able to trade on the second buying marketmaking order. The marketplace may act so that those intentions are carried out. For example, that marketplace may do so by preventing the second marketmaking participant from viewing, accessing, trading on the first buying marketmaking order from the first Sellside participant.

Sellside participants may adjust the Buyside participants that are approved after an order is listed by adding or removing participants. Buyside participants may be assigned a random number id each day. The id may be included in activity reports such as trades with the Sellside participant for the day. That may allow Sellside participant to track their activity without revealing their actual identity. If a Sellside participant believes that a Buyside participant is engaging in suspicious behavior, the Sellside participant may notify the marketplace with the random id number. In this way, the Sellside participant may have the Buyside participant removed from an approved list without reveling to the Sellside participant the identity of the Buyside participant.

In some embodiments, Buyside participants may identify to the marketplace a list of approved Sellside entities. The approved list may vary per order and/or per Buyside participant. The marketplace may receive the list before, with the order, and/or after the order. The marketplace may make orders available to Buyside participant for which there is bilateral approval (e.g., approval from both a Buyside participant and a Sellside participant.)

The marketplace may store Buyside and Sellside approval information. Such information may be stored in a bilateral counterparty approval matrix. Each cell of a matrix may store bilateral approval status for a pair of counterparties. For example, rows of a two dimensional matrix may indicate Buyside participants and columns may indicate Sellside participants. The cell data structure may contain indicators of whether the Sellside participant and the buy side participant pair at that cell have approved one another for trading. Bilateral approvals for a Buyside participant may be determined by traversing a row of the matrix for the Buyside participant to find each cell that indicates bilateral approval. In response to obtaining an approval list from a Sellside participant an indicator may be set in each appropriate cell identifying that the Sellside participant has approved a Buyside participant. In response to receiving an approval list from a Buyside participant an indicator may be set in each appropriate cell identifying that the Buyside participant has approved a Sellside participant. If both such indicators are set at a cell, then a bilateral approval has occurred for a Buyside and Sellside pair.

Such a matrix may be accessed to determine which orders are accessible by each party. For example, such a matrix may be accessed to determine which orders to display to a participant. In some implementations, such approval may apply to all trading. In other implementations, such approval may apply to liquidity provision trading and not CLOB trading.

Matching orders may be distributed among the approved Sellside participants according to a marketplace determination. In some embodiments, a marketmaking order may be given matching preference if the Sellside participant of that order also has an order book order pending at the corresponding best bid or offer. For example, the first Sellside participant may be given matching preference over the second Sellside participant if the first Sellside participant has an order pending to buy as the best bid price on the marketplace and the second Sellside participant does not.

In such an example, a first Sellside participant may have an order at the best bid for 1 million units and a marketmaking order for 500 million units two ticks below that order. The second sellside participant may have an order one tick behind the best bid for 1 million units and a marketmaking order for 800 million unit two ticks behind the best bid. If the first Buyside participant enters the marketplace with a sell offer for 600 million units "fill or kill," the order may be first matched against the best bid 1 million from the first Sellside participant. This may leave 599 million of in size remaining in the offer. The marketplace may match the order next against the marketmaking orders in order of marketplace preference. The first Sellside participant may be given preference based on the having the best bid price in the order book. So, 500 million of the offer may be matched with the first Sellside participant's marketmaking order next. Then, the remaining 99 million in the offer may be matched with the second Sellside participants 800 million marketmaking order.

In response, the second Sellside participant's order book order for 1 million at one tick behind the first Sellside participants original order book order may become the new best bid. In response, the remaining 701 million marketmaking order from the second Sellside participant may have its price adjusted back one tick to remain two ticks behind the new best bid or may be refreshed back to 800 million by the second Sellside participant. This may be performed automatically by the marketplace in response to the changing market condition.

In the above example, an order from the first Sellside participant at the best bid for 1 million units is match and filled first. However, in other embodiments, this order may not be matched against first. Instead, matching may begin with the marketmaking order. For example, an order for 500 million may match all of the 500 million marketmaking order from the first Sellside participant and none of the best bid. This may have an insignificant effect on price because marketmaking orders may be substantially larger than best bids or offers. This arrangement may increase speed of transactions and reduce power consumption by reducing instructions necessary for processing and messaging used for reporting. If there is additional order size remaining after matching with the marketmaking order, embodiments may then match against a best bid or may move on to other market making orders. Using other marketmaking orders first may result in a faster more efficient energy operation.

In some embodiments, where there are multiple marketmaking Sellside participants at the best bid or offer or none at the best bid or offer, size may be distributed in a variety of manners. For example, a pro rate manner may be used, a preference for active participants may be used, a time ordered preference may be used, a price of order book order preference may be given, and so on.

Buyside participants may have a preference for trading with one or more Sellside participants. For example, preventing information leakage is of great importance to Buyside participants. As another example obtaining research is also of great importance to Buyside participants. Some Sellside participants may have preferential relationships with Buyside participants because of information security and/or research provision acts. The Buyside participants may identify a preference indicator to the marketplace that may override traditional matching determinations.

For example, the first Buyside participant may identify a preference for the second Sellside participant in the above example. Instead of matching with the first Sellside participant's marketmaking order, the marketplace may instead honor the preference and the second Sellside participant may be matched instead. In that case, the example may instead leave the second Sellside participant's order book order as the new best bid and leave the first Sellside participant's entire 500 million marketmaking to two ticks behind the new best bid with the second participant's marketmaking orders remaining 201 million.

A Buyside participant may be presented with an interface through which information about available marketmaking orders is displayed. Such an interface may show a size of availability of marketmaking orders that are available to a particular Buyside participant while maintaining anonymity of the participants that are making the markets. Such an interface may show a price of orders (e.g., as an actual price and/or differential from a best bid or offer).

In order to populate such an interface with useful information, a marketplace may access an approved counterparty matrix to determine which counterparties have bilateral approval for a Buyside participant that is being shown the interface. For each counterparty for which the matrix indicates bilateral approval, information about marketmaking orders from that participant may be determined and used to populate the interface. Accordingly, the Buyside participant may be shown information about marketmaking orders for counterparties that have bilateral approval but no other orders that the Buyside participant would not be enabled to trade against.

In some embodiments, a Buyside participant may be given an option of requesting from the marketplace that an interface be populated with information about marketmaking orders from a specific Sellside participant. For example, a Buyside participant may desire to see marketmaking orders from JP Morgan. The marketplace may determine such orders and present them to the Buyside participant (e.g., if the parties are bilaterally approved). This feature may remove an element of anonymity for the Sellside participant. However, this feature may enable the Buyside participants to provide trades more easily to those participants with which they have favorable relationships. Other embodiments may not have such a feature to protect anonymity.

In some embodiments, a marketplace may make a determination of whether to use maketmaking orders or standard order book orders in filling an order. Such a determination may be made in the best interests of an aggressor. For example, if there are pending orders outside of the marketmaking orders that would provide a better price to an aggressor, the standard orders may be matched against. This may be the case for example if there is sufficient liquidity at the best bid to fill an aggressor order. If standard orders cannot fill the order, then the marketmaking order system may be used instead.

In some embodiments, Sellside participants can provide passive marketmaking orders but may not be able to view those order from other participants. In some embodiments, Sellside participants can enter CLOB order and passive marketmaking orders but not aggressive orders to passive marketmaking orders. In some embodiments, Buyside participants can enter CLOB orders and orders that are aggressive to passive marketmaking orders but not passive marketmaking orders.

Figure 2:
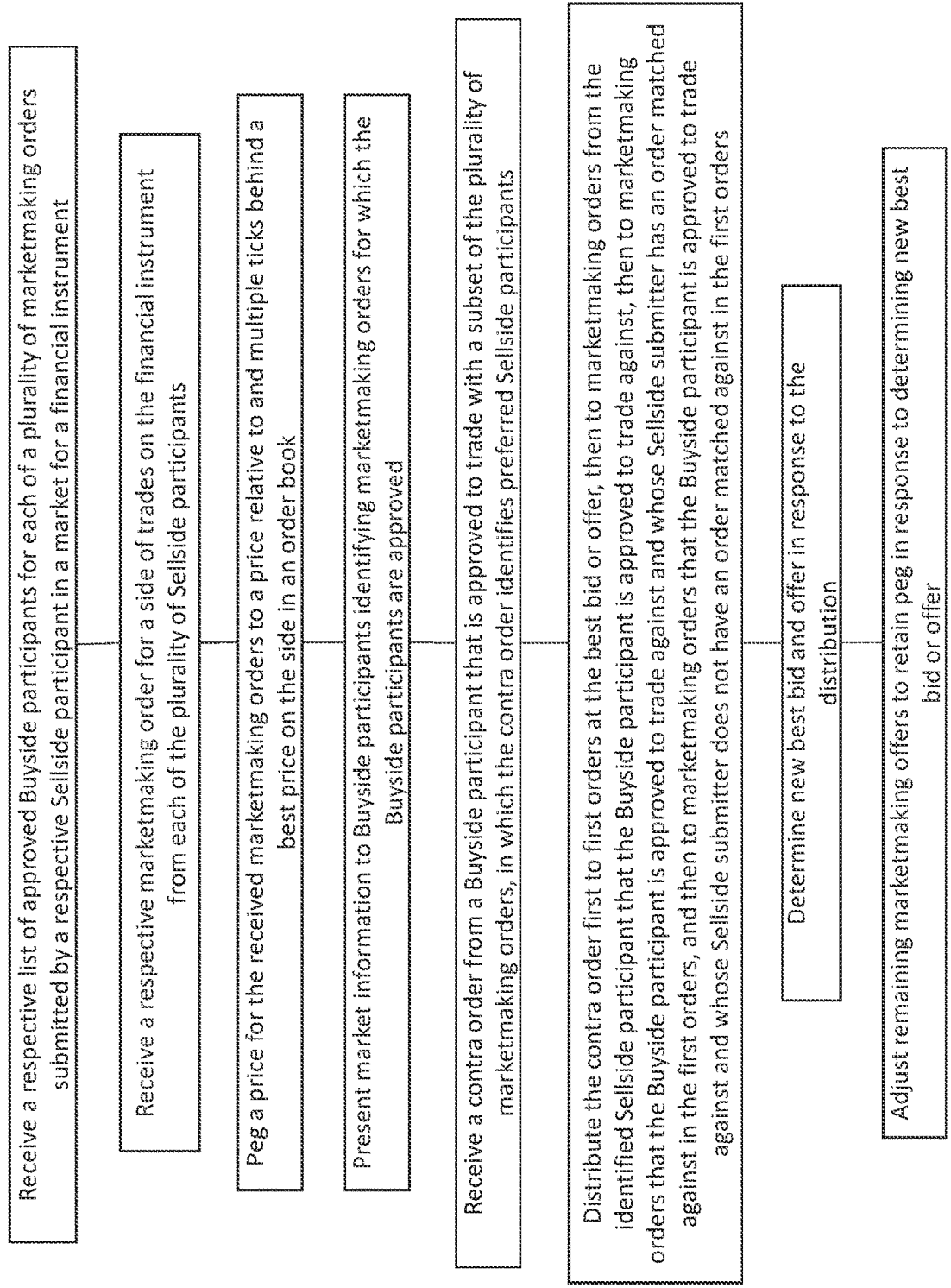
FIG. 2 shows an example method according to some embodiments.

Some embodiments may include performing a method. Such a method may be performed by a platform to enable trading using marketmaking orders from Sellside participants. The method may be performed by a computing device based on execution of one or more instructions stored on a non-transitory medium. FIG. 2 illustrates an example method that may be used in some embodiments.

As indicated, some embodiments may include receiving respective list of approved Buyside participants for each of a plurality of marketmaking orders submitted by a respective Sellside participant in a market for a financial instrument. As indicated, some embodiments may include receiving a respective marketmaking order for a same side of a trade on the financial instrument from each of the plurality of Sellside participants. As indicated, some embodiments may include pegging a price for all the received marketmaking orders to a price relative to and multiple ticks behind a best price on the side of the trade in an order book. As indicated, some embodiments may include presenting market information to Buyside participants identifying marketmaking orders for which the Buyside participants are approved. As indicated, some embodiments may include receiving a contra order from a Buyside participant that is approved to trade with a subset of the plurality of marketmaking orders, in which the contra order identifies a preferred Sellside participants. As indicated, some embodiments may include distributing the contra order first to first orders at the best bid or offer, then to marketmaking orders from the identified Sellside participant that the Buyside participant is approved to trade against, then to marketmaking orders that the Buyside participant is approved to trade against and whose Sellside submitter has an order matched against in the first orders, and then to marketmaking orders that the Buyside participant is approved to trade against and whose Sellside submitter does not have an order matched against in the first orders. As indicated, some embodiments may include determining new best bid and offer in response to the distribution. As indicated, some embodiments may include adjusting remaining marketmaking offers to retain peg in response to determining new best bid or offer. It should be recognized that this method is given as an example only. Other examples may include other methods of different order and/or with different actions.

It should be recognized that while various examples and features are given throughout, that such examples are non-limiting. Implementations may include any desired combinations of elements in any order from any of the various examples given herein. Other embodiments may include additional fewer, or different elements as desired.

For example, in some implementations, pricing may be performed at the $1/16^{th}$ of a $1/32^{nd}$ increment. Such an embodiment may provide a high level of price granularity in a system that is familiar. As another example, some embodiments may avoid compression protection across increment barriers allowing traders to perform such analysis themselves.

As another example, rather than pegging liquidity provision orders to a razor's edge or best CLOB price, some embodiments may include separate books: a CLOB and a block book. A CLOB may operate for smaller order sizes (e.g. no limit in size, 1 million minimum, etc.). A block book may operate for larger order sizes (e.g., 100 million, 500 million, 1 billion, 2 billion, etc.). Sizes of orders for such books may differ based on a financial instrument (e.g., more liquid instruments may have larger size minimums). An electronic marketplace may maintain separate CLOB and block books for each financial instrument. In some embodiments, liquidity providers may enter orders of any size that may meet an optional minimum size amount in a CLOB. Though, generally smaller order may be placed there and in other embodiments there may be a size maximum in the CLOB (e.g., equal to or less than the minimum of the block book). Larger orders that meet a much higher minimum size may be placed in a block book. This block book embodiment may operate similar to the liquidity provision orders above with the exception hat the block book orders are not tied or pegged to CLOB orders. Price changes in a CLOB may not affect prices in a block book. Similarly, a liquidity provider may not be required to have an order in a CLOB in order to participate in the block book in such an embodiment. In some embodiments, order filling may be performed through the book chosen by a liquidity taker (e.g., if a taker hits the CLOB then the CLOB orders fill, if the taker hits a block book with an order of minimum size or above, then the block book orders fill). Order filing my use a priority mechanism such as the promo codes described above. Some embodiments may give preference to larger liquidity providers, liquidity providers with CLOB order at a razors edge price, and so on. In some embodiments, order filling may be performed through a book determined by a marketplace (e.g., matching an order size minimum as described below).

Although an example of a block book with a single size minimum is given, it should be recognized that other embodiments may include any number of different size restrictions. For example, a block book may include a multiple leveled ladder of pricing and minimum sizes. Size requirements, and/or number of steps may be determined based on characteristics of a financial instrument (e.g., liquidity). As an example, a two year treasury may have four separate entries in a block book: one entry for one hundred million minimum orders, one entry for five hundred million minimum orders, one entry for one billion minimum orders and one entry for two billon minimum orders. Liquidity providers may submit orders and a marketplace may enter them into an appropriate enter in a block book that matches the size of the order. The block book may track, match and fill orders in each size entry separately. A liquidity taker wanting to fill an order that meets a minimum size threshold may submit an order to the matching entry of the block book. The submitted order may be filled through the appropriate block book entry with orders pending in that entry according to a priority mechanism (e.g., promo codes).

In some embodiments, when an order from a liquidity taker arrives an electronic marketplace may determine whether to process through the CLOB or the block book based on the order size. If the order meets the block book minimum, the order may be routed to the block book rather than the CLOB. The marketplace may determine which entry in the block book to use to fill the order. Similarly, such a determination may be based on the size of the order. The marketplace may use the entry that has the largest minimum size requirement that the order meets to fill the order. For example, a six hundred million order may be processed in the five hundred million block book.

In some embodiments, if there is unmatched order left after filling the aggressor order through the determined block book entry, that liquidity may be filled with other orders (e.g., in another entry, in the CLOB). For example, a next highest minimum block book entry may be used to fill an unfilled portion continually. If all entries with matching prices are used up, the CLOB may also be used to fill such leftover liquidity in some embodiment. In other embodiments, only a single entry of the block book may be used to fill liquidity of an order matching that entry.

Some embodiments may protect liquidity providers in a block book from manipulation by liquidity takers. A liquidity provider that enters orders in a higher entry of a block book can expect a higher price. Such a higher price represents a liquidity premium. Some embodiments may prevent a liquidity taker form entering more than one order on a side of a trader for a financial instrument during a time period. A length of a time period may be based on liquidity of an instrument. Such a time period may range from, for example, milliseconds, to one second, to five minutes, to ten minutes. This order placement prevention may incentive the liquidity taker to use an appropriate size order to take desired liquidity. If the taker places a full size order, then the desire of the taker may be filled with one order at an appropriate price. If the taker attempts to split the order into smaller orders to take advantage of lower priced block book entries, the taker may be prevented from placing such repeated orders. An electronic market may track orders placed, receive new orders and compare them to the tracked orders. If the new orders are submitted on the same side of a previous block book order for an instrument during a prevention period by a same submitter, the marketplace may notify a submitter that the order is not placed. After the time period, orders on that side may be placed again by the taker.

Embodiments may improve technical functionality, solve technical problems, provide technical solutions, and/or be rooted in computing technologies.

Traditional trading without the benefit of contemporary computing solutions is unable to provide the speed and analysis of multiple data sources that various embodiment provide. Algorithms and matching engines run at an incredibly fast speed. A human in a traditional trading environment could not manually process the vast amounts of data needed to interact with fast moving contemporary electronic markets such as those described herein.

Pegging a marketmaking order to a best bid or offer price automatically by a platform may provide a technical solution to a technical problem rooted in electronic trading technologies. The high speed of market activity means that network latency and processing time can become serious issues. If a market moves, the time to report that movement, process that movement and respond to that movement may mean that a participant has lost significant amounts of money. That may be the case even if only fractions of a second pass.

Traditionally, to keep an order pegged at a price distance from another order, a market would operate by relying on a submitter of the order to monitor the market movement and adjust the order. But, because of the high speeds of market movement and the network and processing latency, when the market moves there may be a delay as the submitter adjusts the order. By pegging the price locally at the platform, latency is removed, and the submitter is protected from risk. Traditionally, the submitter would be at risk of a race condition after the market moves. For example, the market would move, and the submitter would submit an adjustment to the order to move the price accordingly. But another trader may race to beat the submitter's adjustment. The submitter wants to change the price of the order, but another trader may enter a contra order before the submitter's desire reaches a traditional marketplace. Some embodiments of the platform described herein that locally peg the price to the market movement may protect the submitter by substantially eliminating this race condition.

Moreover, some embodiments may reduce bandwidth usage and/or processing operations. For example, in the traditional market where a submitter self-adjusts an order, the submitter may be required to submit many order price adjustments. Each such price adjustment may use bandwidth and require processing be done at both the marketplace receiving the adjustment and the submitter making the adjustment. In some embodiments of the platform described herein, bandwidth usage may be reduced because such adjustment submissions may not be used, and less processing may be performed because adjustment orders may not be received or transmitted. This may create both a more energy efficient and bandwidth efficient marketplace.

Various embodiments provide levels of anonymity and information security that might not typically be found in public markets. In open outcry markets used before electronic trading, trading intentions and identity became public knowledge. In typical electronic trading systems, orders are published to a broad market and reports of trading activity are similarly reported to the broad market. In various embodiments herein, problems with such information distribution and identity leakage are addressed and participants can feel confident in market participation.

Additionally, order access in traditional non-electronic and electronic markets is open to all. In a traditional market there is no ability to engage in trading according to a complicated web of bilateral approvals and preferences. Various embodiments described herein create mappings between market participants so that trading counterparty preferences can be matched that would not be possible in a traditional marketplace.

The following sections provide a guide to interpreting the present application.

I. Terms

The term "product" means a machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise.

The term "variation" of an invention means an embodiment of the invention, unless expressly specified otherwise.

The term "indication" is used in an extremely broad sense. An "indication" of a thing should be understood to include anything that may be used to determine the thing.

An indication of a thing may include an electronic message that identifies the thing (e.g., an identification of a widget by a serial number affixed to the widget, an identification of a widget by one or more characteristics of the widget). An indication of a thing may include information that may be used to compute and/or look-up a thing (e.g., information identifying a machine of which a widget is a part that may be used to determine the widget). An indication of a thing may specify things that are related to the thing (e.g., characteristics of the thing, a name of the thing, a name of a thing related to the thing). An indication of a thing may not specify things that are related to the thing (e.g., a letter "a" may be an indication of a widget of a computer system that is configured to interpret the letter "a" to identify the widget). An indication of a thing may include a sign, a symptom, and/or a token of the thing. An indication, for example, may include a code, a reference, an example, a link, a signal, and/or an identifier. An indication of a thing may include information that represents, describes, and/or otherwise is associated with the thing.

A transformation of an indication of a thing may be an indication of the thing (e.g., an encrypted indication of a thing may be an indication of the thing). An indication of a thing may include the thing itself, a copy of the thing, and/or a portion of the thing. An indication of a thing may be meaningless to a thing that is not configured to understand the indication (e.g., a person may not understand that a letter "a" indicates a widget, but it may nonetheless be an indication of the widget because the computer system may determine the widget from the letter "a"). It should be understood that the fact that an indication of a thing may be used to determine the thing does not mean that the thing or anything else is determined. An indication of a thing may include an indication of any number of the thing unless specified otherwise. An indication of a thing may include an indication of other things (e.g., an electronic message that indicates many things). (Indication can be used as a very broad term in claim language. For example: receiving an indication of a financial instrument.)

The term "represent" means (1) to serve to express, designate, stand for, or denote, as a word, symbol, or the like does; (2) to express or designate by some term, character, symbol, or the like; (3) to portray or depict or present the likeness of, as a picture does; or (4) to serve as a sign or symbol of.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may include or cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments may cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget but may possibly include one or more other items as well.

The term "consisting of" and variations thereof mean "including and also limited to", unless expressly specified otherwise. Thus, for example, the sentence "the machine consists of a red widget and a blue widget" means the machine includes the red widget and the blue widget but does not include anything else.

The term "compose" and variations thereof mean "to make up the constituent parts of, component of, or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The terms "a", "an" and "the" refer to "one or more", unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the feature," then the phrase "the feature" should be understood to refer to the previously mentioned "a specific single feature." (It should be understood that the term "a" in "a specific single feature" refers to "one" specific single feature and not "one or more" specific single features.)

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of" each of the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". The phrase "based at least on" is equivalent to the phrase "based at least in part on". For example, the phrase "element A is calculated based on element B and element C" covers embodiments where element A is calculated as the product of B times C (in other words, A=B×C), embodiments where A is calculated as the sum of B plus C (in other words, A=B+C), embodiments where A is calculated as a product of B times C times D, embodiments where A is calculated as a sum of the square root of B plus C plus D times E, and so on.

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number, and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" modifies do not establish specific further limitations of the claim or otherwise restrict the meaning or scope of the claim.

The terms "e.g.", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers in the range, unless expressly specified otherwise. For example, the range "1 to 10" includes the integers from 1 to 10 (e.g., 1, 2, 3, 4, . . . 9, 10) and non-integers (e.g., 1.0031415926, 1.1, 1.2, . . . 1.9).

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), rendering into electronic format or digital representation, ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing, averaging and the like.

The term "determining" does not imply that mathematical processing must be performed and does not imply that numerical methods must be used and does not imply that an algorithm is used.

The term "determining" does not imply that any particular device must be used. For example, a computer need not necessarily perform the determining.

The term "determining" may include "calculating". The term "calculating" should be understood to include performing one or more calculations. Calculating may include computing, processing, and/or deriving. Calculating may be performed by a computing device. For example, calculating a thing may include applying an algorithm to data by a computer processor and generating the thing as an output of the processor.

The term "determining" may include "referencing". The term "referencing" should be understood to include making one or more reference, e.g., to a thing. Referencing may include querying, accessing, selecting, choosing, reading, and/or looking-up. The act of referencing may be performed by a computing device. For example, referencing a thing may include reading a memory location in which the thing is stored by a processor.

The term "determining" may include "receiving". For example, receiving a thing may include taking in the thing. In some embodiments, receiving may include acts performed to take in a thing, such as operating a network interface through which the thing is taken in. In some embodiments, receiving may be performed without acts performed to take in the thing, such as in a direct memory write or a hard wired circuit. Receiving a thing may include receiving a thing from a remote source that may have calculated the thing.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. In some embodiments, such a plurality of computer-based devices may operate together to perform one step of a process such as is common in grid computing systems. In some embodiments, such a plurality of computer-based devices may operate provide added functionality to one another so that the plurality may operate to perform one step of a process such as is common in cloud computing systems. (Conversely, a single computer-based device may be substituted with multiple computer-based devices operating in cooperation with one another. For example, a single computing device may be substituted with a server and a workstation in communication with one another over the internet.) Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. Disclosed Examples and Terminology Are Not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. § 1.72(b).

The headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The disclosed invention is widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims that recite anything other than a statutory class shall be interpreted to recite purposes, benefits and possible uses of the claimed invention, and such preambles shall not be construed to limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued and canceled claims). In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries. Devices are in communication with one another if they are capable of at least one-way communication with one another. For example, a first device is in communication with a second device if the first device is capable of transmitting information to the second device. Similarly, the second device is in communication with the first device if the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

The term "compute" shall mean to determine using a processor in accordance with a software algorithm.

A "processor" means one or more microprocessors, central processing units (CPUs), computing devices, microcontrollers, digital signal processors, graphics processing units (GPUs) or like devices or any combination thereof, regardless of the architecture (e.g., chip-level multiprocessing or multi-core, RISC, CISC, Microprocessor without Interlocked Pipeline Stages, pipelining configuration, simultaneous multithreading, microprocessor with integrated graphics processing unit, GPGPU).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the method.

The apparatus that performs the process can include a plurality of computing devices that work together to perform the process. Some of the computing devices may work together to perform each step of a process, may work on separate steps of a process, may provide underlying services that other computing devices that may facilitate the performance of the process. Such computing devices may act under instruction of a centralized authority. In another embodiment, such computing devices may act without instruction of a centralized authority. Some examples of apparatus that may operate in some or all of these ways may include grid computer systems, cloud computer systems, peer-to-peer computer systems, computer systems configured to provide software as a service, and so on. For example, the apparatus may comprise a computer system that executes the bulk of its processing load on a remote server, but outputs display information to and receives user input information from a local user computer, such as a computer system that executes VMware software.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any non-transitory medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), wireless local area network communication defined by the IEEE 802.11 specifications whether or not they are approved by the Wi-Fi Alliance, SAP, ATP, Bluetooth, and TCP/IP, TDMA, CDMA, and 3G; and/or (iv) encrypted to ensure privacy or prevent fraud in any of a variety of ways well known in the art.

The term "database" refers to any electronically-stored collection of data that is stored in a retrievable format.

The term "data structure" refers to a database in a hardware machine such as a computer.

The term "network" means a series of points or nodes interconnected by communication paths. For example, a network can include a plurality of computers or communication devices interconnected by one or more wired and/or wireless communication paths. Networks can interconnect with other networks and contain subnetworks.

The term "predetermined" means determined beforehand, e.g., before a present time or a present action. For example, the phrase "displaying a predetermined value" means displaying a value that was determined before the act of displaying.

The term "condition" means (1) a premise upon which the fulfillment of an agreement depends, or (2) something essential to the appearance or occurrence of something else.

The term "transaction" means (1) an exchange or transfer of goods, services, or funds, or (2) a communicative action or activity involving two parties or things that reciprocally affect or influence each other.

Thus a description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel®, Pentium®, or Centrino™, Atom™ or Core™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back into plaintext. An example of an asymmetric key algorithm is the RSA algorithm.

VI. Continuing Applications

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application. Applicants intend to file additional applications to pursue patents for subject matter that has been disclosed and enabled but not claimed in the present application.

VII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application will be prefaced by the phrase "does not include" or by the phrase "cannot perform".

VIII. Prosecution History

In interpreting the present application (which includes the claims), one of ordinary skill in the art refers to the prosecution history of the present application, but not to the prosecution history of any other patent or patent application, regardless of whether there are other patent applications that are considered related to the present application, and regardless of whether there are other patent applications that share a claim of priority with the present application.

What is claimed is:

1. A method comprising:
controlling, by at least one processor of an electronic exchange platform:
receiving, over a communication network, a plurality of marketmaking orders for a side of trades for a financial instrument from each of a plurality of sellside participants in a market for the financial instrument;
in response to receiving the plurality of marketmaking orders, pegging a first price for each of the plurality of marketmaking orders to a price relative to and behind a best price on the side of trades in an order book for the market, such that the first price for each of the plurality of marketmaking orders is in a pegged relationship with the best price;
in response to receiving the plurality of marketmaking orders, populating, over the communication network, a respective interface of at least one buyside participant, of a plurality of buyside participants in the market for the financial instrument, with market information that includes information about a respective subset of the plurality of marketmaking orders for which the at least one buyside participant is determined to be an approved buyside participant from approval data in a memory indicating, for each of the plurality of marketmaking orders, respective approved buyside participants out of the plurality of buyside participants;
receiving, over the communication network from a first buyside participant, a contra order to the plurality of marketmaking orders, in which the first buyside participant is approved to trade with a subset of the sellside participants and in which the contra order identifies a preferred sellside participant;
in response to receiving the contra order, distributing the contra order first to orders in the order book according to a priority scheme to distribute liquidity, in which the priority scheme prioritizes distributing liquidity to orders at a best bid or offer counter to the contra order over distributing liquidity to marketmaking orders that the first buyside participant is approved to trade against and whose sellside submitter does not have an order at the best bid or offer counter to the contra order;

automatically in response to the distributing of the contra order, determining new best bid and offer prices in the order book; and automatically in response to determining the new best bid and offer prices in the order book, without processing any order price adjustment information over the communication network from any of the sellside participants having respective remaining marketmaking orders of the plurality of marketmaking orders, removing latency by, at the electronic exchange platform, locally pegging an adjusted price to a new best price on the side of trades determined from the new best bid or offer prices, by adjusting the remaining marketmaking orders of the plurality of marketmaking orders to the adjusted price to retain the pegged relationship between the adjusted price of each of the remaining marketmaking orders and the new best price on the side of trades determined from the new best bid or offer prices.

2. The method of claim 1, further comprising:

controlling, by the at least one processor, populating, over the communication network, a respective interface of at least one given buyside participant of the plurality of buyside participants with the adjusted price for each of the remaining marketmaking orders for which the at least one given buyside participant is determined to be an approved buyside participant.

3. The method of claim 1, in which the financial instrument includes a bond.

4. The method of claim 1, in which the electronic exchange platform includes a network link, and a non-transitory memory on which instructions are stored to be executed by the at least one processor.

5. The method of claim 1, further comprising:

controlling, by the at least one processor, adjusting the remaining marketmaking orders to the adjusted price to retain the pegged relationship with a given new best price on the side of trades, automatically in response to market movement without input from the sellside participants.

6. The method of claim 1, further comprising:

controlling, by the at least one processor:

receiving, over the communication network, an adjustment to the approved buyside participants; and adjusting, over the communication network, a respective interface of each buyside participant of the approved buyside participants to reflect the adjustment.

7. The method of claim 1, further comprising:

controlling, by the at least one processor, populating, over the communication network, a sellside interface of a given sellside participant with market information for the financial instrument and controls for the given sellside participant to enter and submit one of the plurality of marketmaking orders.

8. The method of claim 1, further comprising:

controlling, by the at least one processor, adjusting, over the communication network, an interface of a given sellside participant in response to the adjusting the remaining marketmaking orders to the adjusted price.

9. The method of claim 1, in which at least one of the respective interface includes an entry form for the preferred sellside participant, and an indication of order sizes available from approved sellside participants at the first price.

10. The method of claim 1, in which the marketmaking orders include orders to buy the financial instrument and the contra order includes an order to sell the financial instrument.

11. The method of claim 1, in which the first price for each of the plurality of marketmaking orders is pegged multiple ticks behind the best price.

12. The method of claim 1, in which the market information includes best bid and offer, size available at the best bid and offer, and liquidity orders available to the buyside participants.

13. The method of claim 1, in which the priority scheme prioritizes distributing liquidity to marketmaking orders from the preferred sellside participant over distributing liquidity to a subset of marketmaking orders of the plurality of marketmaking orders that the first buyside participant is approved to trade against and whose sellside submitter has an order at the best bid or offer counter to the contra order.

14. A non-transitory storage medium configured to store instructions which, when executed by a processor of an electronic exchange platform, control:

receiving, over a communication network, a plurality of marketmaking orders for a side of trades for a financial instrument from each of a plurality of sellside participants in a market for the financial instrument;

in response to receiving the plurality of marketmaking orders, pegging a first price for each of the plurality of marketmaking orders to a price relative to and behind a best price on the side of trades in an order book for the market, such that the first price for each of the plurality of marketmaking orders is in a pegged relationship with the best price;

in response to receiving the plurality of marketmaking orders, populating, over the communication network, a respective interface of at least one buyside participant, of a plurality of buyside participants in the market for the financial instrument, with market information that includes information about a respective subset of the plurality of marketmaking orders for which the at least one buyside participant is determined to be an approved buyside participant from approval data in a memory indicating, for each of the plurality of marketmaking orders, respective approved buyside participants out of the plurality of buyside participants;

receiving, over the communication network from a first buyside participant, a contra order to the plurality of marketmaking orders, in which the first buyside participant is approved to trade with a subset of the sellside participants and in which the contra order identifies a preferred sellside participant;

in response to receiving the contra order, distributing the contra order first to orders in the order book according to a priority scheme to distribute liquidity, in which the priority scheme prioritizes distributing liquidity to orders at a best bid or offer counter to the contra order over distributing liquidity to marketmaking orders that the first buyside participant is approved to trade against and whose sellside submitter does not have an order at the best bid or offer counter to the contra order;

automatically in response to the distributing of the contra order, determining new best bid and offer prices in the order book; and automatically in response to determining the new best bid and offer prices in the order book, without processing any order price adjustment information over the communication network from any of the sellside participants having respective remaining marketmaking orders of the plurality of marketmaking orders, removing latency by, at the electronic exchange platform, locally pegging an adjusted price to a new best price on the side of trades determined from the new best bid or offer prices, by adjusting the remaining marketmaking orders of the plurality of marketmaking orders to the adjusted price to retain the pegged relationship between the adjusted price of each of the remaining marketmaking orders and the new best price on the side of trades determined from the new best bid or offer prices.

\* \* \* \* \*